United States Patent [19]

Beccaris

[11] 4,222,470
[45] Sep. 16, 1980

[54] BAND BRAKE FOR A ROTATING MEMBER, AND A CLUTCH HAVING SUCH A BRAKE

[75] Inventor: Carlo Beccaris, Santena, Italy

[73] Assignee: Societe Anonyme Francaise du Ferodo, Paris, France

[21] Appl. No.: 941,987

[22] Filed: Sep. 13, 1978

[30] Foreign Application Priority Data

Sep. 16, 1977 [FR] France .................... 77 27970

[51] Int. Cl.³ .................................... V16D 67/04
[52] U.S. Cl. ............................ 192/17 A; 188/77 R
[58] Field of Search ............... 192/12 C, 17 A, 17 D, 192/85 A, 85 AA, 17 R, 17 C, 12 R; 188/75, 77, 365

[56] References Cited

U.S. PATENT DOCUMENTS

| 1,993,856 | 3/1935 | Puls | 188/77 R |
|---|---|---|---|
| 2,638,185 | 5/1953 | Carnagua et al. | 188/77 X |
| 2,838,149 | 6/1958 | Burton | 192/12 C |
| 3,173,515 | 3/1965 | Haddock et al. | 188/75 |
| 3,430,738 | 3/1969 | Dain et al. | 188/75 |
| 3,529,702 | 9/1970 | Eckstein | 192/17 A |

Primary Examiner—George H. Krizmanich
Attorney, Agent, or Firm—Charles E. Brown

[57] ABSTRACT

A band brake for a clutch comprises a band, passed in a loop around a cylindrical bearing surface of a driven part of the clutch, and an operating member adapted to apply the brake band against part of the bearing surface, the operating member comprising two pistons hydraulically moveable in opposite directions in the same cylinder, one piston acting on the brake band and the other piston on the bearing surface, the pistons being actuated to brake the driven part of the clutch when the clutch is disengaged.

8 Claims, 9 Drawing Figures

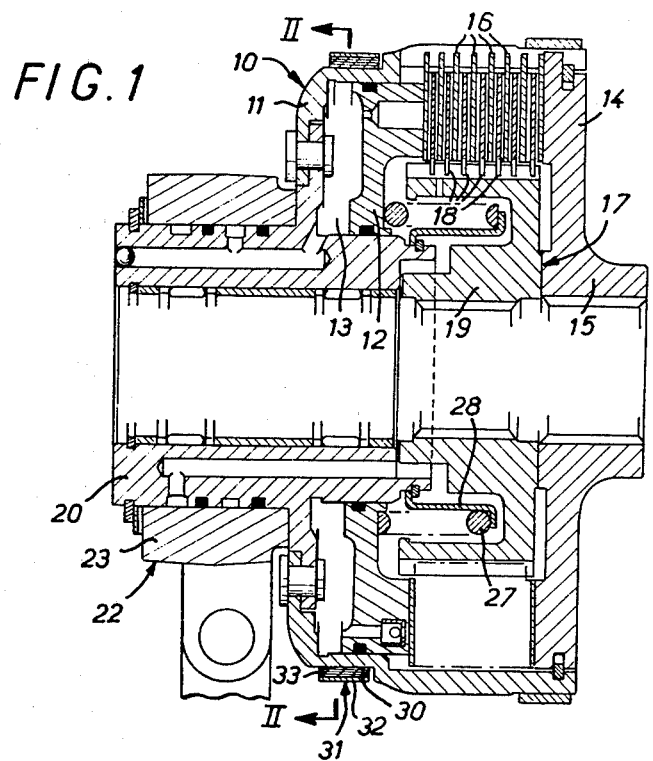
FIG.1
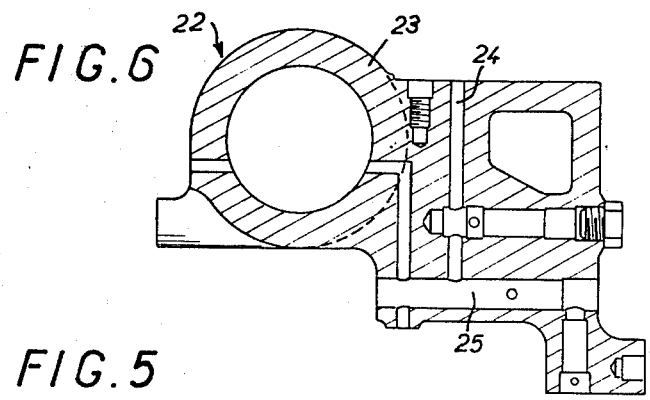
FIG.6
FIG.5
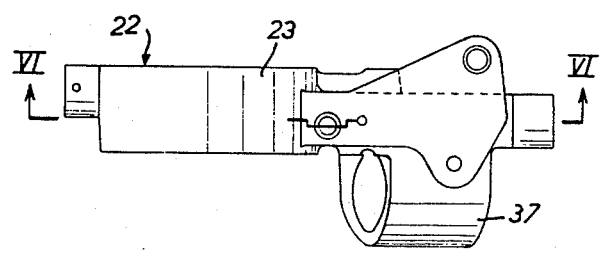

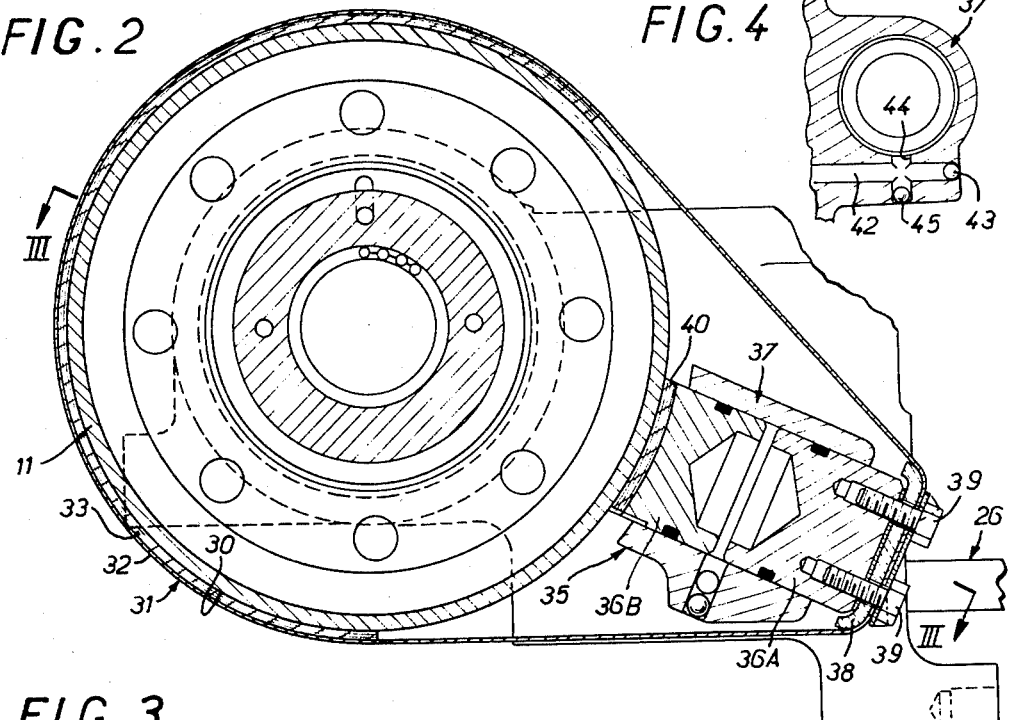
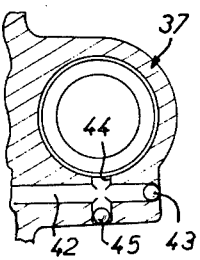
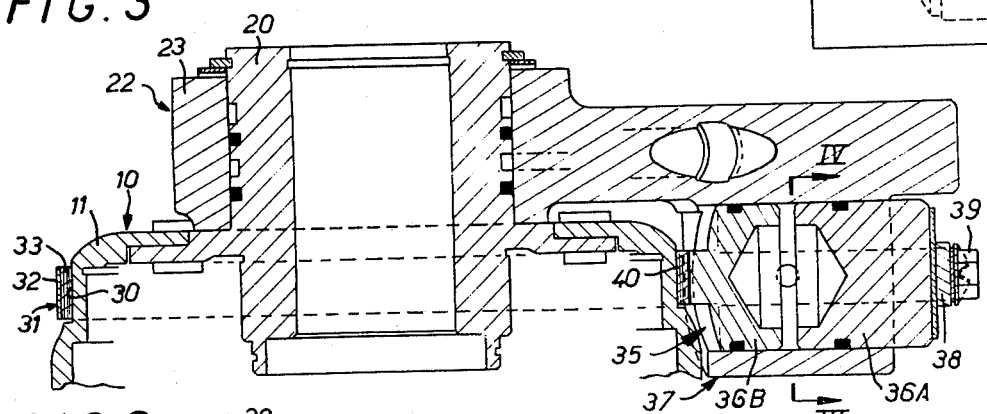
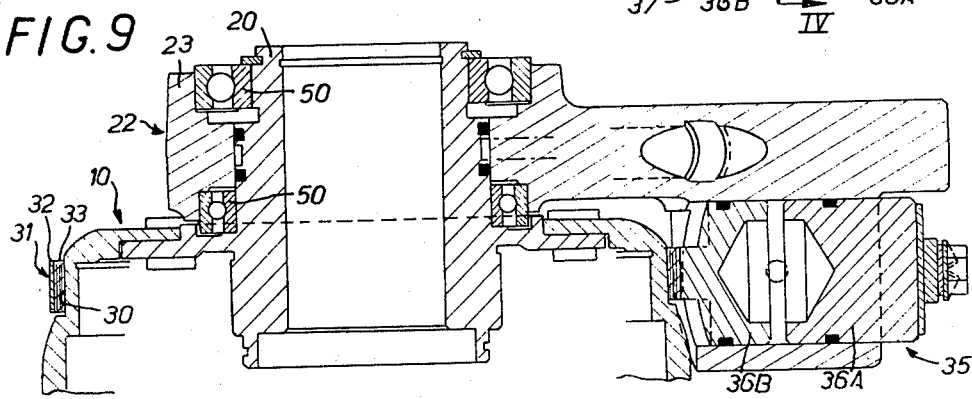

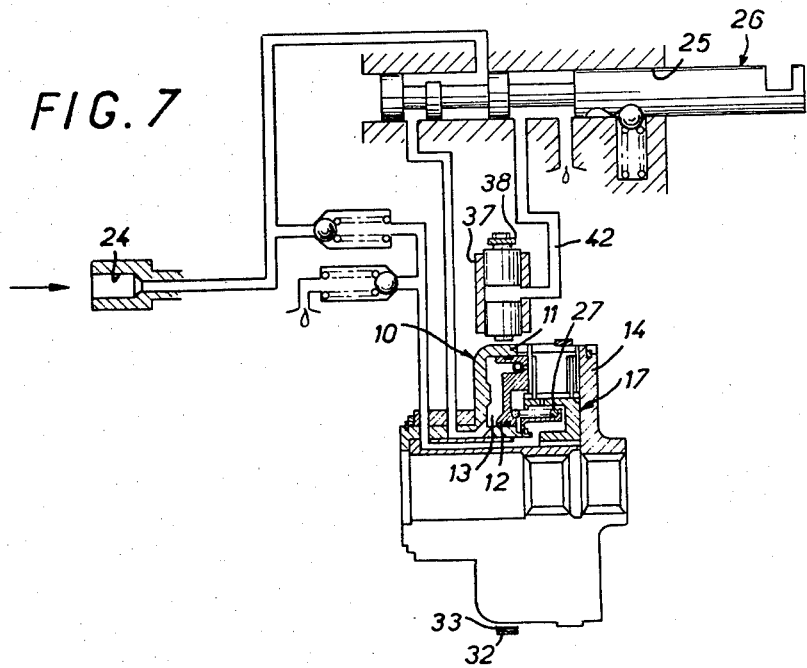
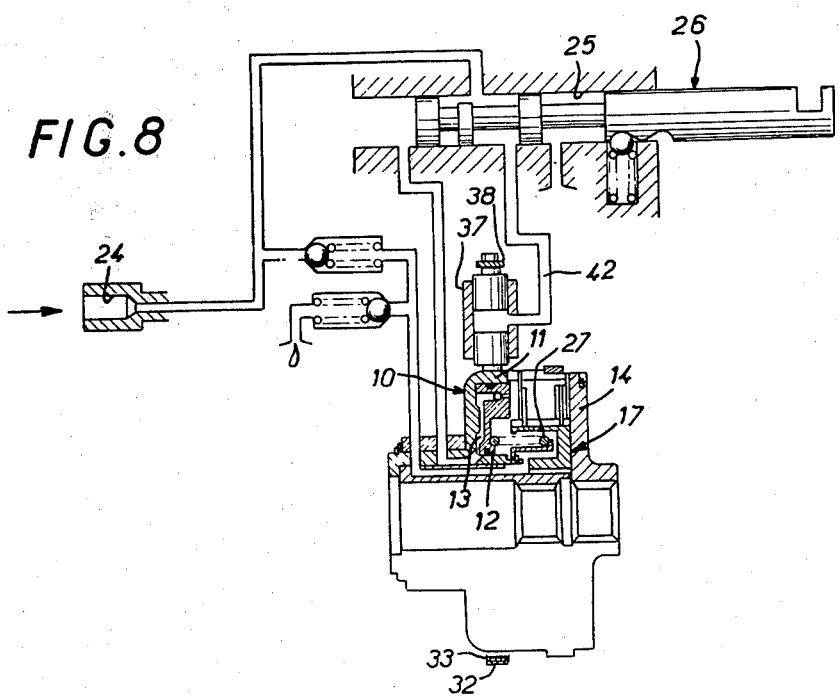

BAND BRAKE FOR A ROTATING MEMBER, AND A CLUTCH HAVING SUCH A BRAKE

BACKGROUND OF THE INVENTION

The present invention relates generally to band brakes and also to mechanisms having a rotating member adapted to be equipped with a brake of this kind.

Such mechanisms are in particular hydraulically operated clutches, especially multidisc clutches, which comprise two coaxial rotating parts, of which one will hereinbelow be referred to as the driven part, which forms a rotating member and comprises two elements which are in a cylinder-piston relationship to one another and which form between them a pressure chamber of variable volume, while the other part will hereinbelow be referred to as the driving part and comprises at least one friction disc which is intended to be axially gripped in engagement by the component elements of the aforesaid driven part in order to fasten the latter rotationally to the driving part when fluid under pressure is delivered into the pressure chamber, and which further comprise elastic means interposed between the component elements of the driven part and urge the latter into the disengaged position, releasing the friction disc.

Clutches of this kind are used in particular for serving a power take-off on tractors.

One of the problems which has to be solved in the construction of clutches of this kind results from the fact that the fluid used in particular for their lubrication and cooling, which in practice is oil, brings about, by a drag effect, undesirable rotation of the driven part when the latter is in the position of disengagement in relation to the driving part, which may make difficult the engagement of any rotary member which is to be operated on the power take-off controlled by the said driven part.

In order to obviate this difficulty it has already been proposed to provide for the driven part of such a clutch a brake adapted to be applied to the said driven part when the latter is in the position of disengagement relative to the corresponding driving part.

In order to take advantage of the presence of the fluid under pressure necessary for operating the clutch, it is usual for this same fluid to be used for operating the brake associated with the clutch.

Among arrangements of this type which are known at the present time it has been proposed to use a brake having a piston type hydraulically operating member adapted to apply a brake shoe against a cylindrical bearing surface on the driven part which is to be controlled.

In clutches of the kind in question it is usual for the clutch to be mounted on a support forming a bearing for its driven part.

This has the consequence that an axial offset inevitably exists between the bearing surface supporting this driven part, and the braking bearing surface of the driven part on which the brake associated with it has to act.

Because of this axial offset, when the brake associated with the driven part of the clutch is operated the driven part is subjected to a tilting moment relative to the support carrying it, and in practice this results in rapid wear of the support.

The present invention has in particular the aim of obviating this disadvantage and to this end proposes to use in a clutch of the kind in question a band brake adapted to apply an at least statically radially balanced action to the driven part of a clutch of this kind.

More precisely it has primarily as an object a band brake of this kind.

Band brakes are well known per se; they comprise a brake band wrapped in a loop around a cylindrical bearing surface of the rotating member which is to be braked, and of an operating member adapted to apply the said brake band against at least part of the cylindrical surface.

A brake of this kind is used in particular in the hydraulically operated multidisc clutch for direct and reverse running which is described in French Pat. No. 926,278.

However, in this patent the operating element used for controlling the brake, which is a hydraulically operated device, comprises only a single piston which is coupled to one end of the brake band in question, while the other end of the brake is coupled to the fixed casing of the whole arrangement.

This results on the one hand in the continued existence of a radial reaction resultant which is not zero, during braking, on the part in question of the clutch, and on the other hand in considerable complexity of the clutch.

The band brake according to the invention makes it possible to avoid these disadvantages and in addition offers other advantages.

SUMMARY OF THE INVENTION

The invention comprises a brake band extending in a loop around a cylindrical bearing surface of the rotating member, and a hydraulically acting operating member adapted to apply the said brake band at least partly against the said cylindrical surface, characterised in that the operating member comprises two elements which are movable in opposite directions and are disposed between the said brake band and the said cylindrical bearing surface, roughly radially in relation to the latter and in alignment with one another, one of them serving to act on the brake band and thus to apply the latter against a first part of the said cylindrical bearing surface, and the other serving to cause a brake shoe to act against a second part of the said cylindrical bearing surface, which second part is diametrically opposite the first part.

For example, the movable elements of a brake of this kind may constitute two pistons arranged to slide in one and the same cylinder. The elements may alternatively comprise a blind cylinder, preferably suitably guided, and a piston mounted for movement in this cylinder.

However this may be, because of their radial alignment in relation to the rotating member concerned the movable elements of a brake of this kind develop forces which balance one another at least statically, so that for the rotating part this gives rise to no radial reaction capable of causing it to tip.

Other conditions being equal, the band brake according to the invention is in addition advantageously capable of better performance than that of comparable band brakes used up to the present time, while being reversible and capable of great simplicity in respect of construction and operation.

It can be used in all mechanisms having a rotating member which has to be braked, and particularly in hydraulically operated clutches, especially multidisc clutches, in which for the reasons briefly explained above the driven part has to be braked when the clutch is disengaged.

The present invention also has as an object a clutch of this kind which is characterised in that a band brake of the kind described above is associated with the rotating member constituting its driven part.

BRIEF DESCRIPTION OF THE DRAWINGS

FIG. 1 is a view in axial section of a clutch equipped with a band brake according to the invention;

FIG. 2 is a view in cross-section of this clutch, taken on the line II—II in FIG. 1;

FIG. 3 is another view thereof in axial section, taken on the line III—III in FIG. 2;

FIG. 4 shows on a different scale a partial sectional view on the line IV—IV in FIG. 3;

FIG. 5 shows on a smaller scale a plan view of the support forming a bearing for the clutch equipped with the band brake according to the invention;

FIG. 6 is a view in cross-section of this support, taken on the line VI—VI in FIG. 5;

FIG. 7 is a block diagram repeating schematically the axial section of the clutch shown in FIG. 1 and illustrating the circulation of operating fluid in this clutch when the latter is in the position of engagement;

FIG. 8 is a similar view to that shown in FIG. 7, but shows the position of disengagement of the clutch;

FIG. 9 is a similar view to that shown in FIG. 3 and relates to a modified embodiment.

DESCRIPTION OF THE PREFERRED EMBODIMENTS

FIG. 1 shows a hydraulically operated multidisc clutch.

The practical construction of a clutch of this kind is well known per se, and since it does not in itself form part of the present invention it will be explained here only briefly.

In a general way, a clutch of this kind comprises two coaxial rotating parts.

One of these parts, referred to hereinbelow as the driven part and given the general reference 10 in the drawings, comprises two elements 11, 12 which are in a cylinder-piston relationship with one another and which form between them a pressure chamber 13 whose volume is variable.

The cylindrical part 11 has the general shape of a bell; beyond the piston part 12, which it surrounds, it is closed by a plate 14 which is axially fast with it and which is carried by a hub 15 adapted to be rotationally fastened on a first shaft, in practice a driven shaft (not shown).

A plurality of interposed discs 16 are rotationally fast with the cylindrical part 11, these discs serving as pressure plates and being mounted for axial movement relative to the cylindrical part 11, between the piston part 12 and the plate 14.

The other coaxial rotatable part of which the clutch according to the invention is composed, which will hereinafter be referred to as the driving part and given the general reference 17 in the drawings, comprises a plurality of friction discs 18 which are spaced axially of the clutch and inserted alternately between the discs 16 and are rotationally fast with, while remaining axially movable, a hub 19 adapted to be rotationally fast with a second shaft, in practice a driving shaft (not shown).

On the side where the pressure chamber 13 is situated the cylinder element 11 of the driven part 10 carries externally a projecting axial sleeve 20 by which it is mounted for rotation in a fixed support 22.

For this purpose this support 22 has a flange 23 which forms a bearing for the sleeve 20 and which therefore carries the entire clutch.

In the embodiment illustrated in FIGS. 1 to 8 there is simple frictional contact between the sleeve 20 of the clutch and the flange 23 of the fixed support 22.

In a manner known per se this support 22 forms not only a bearing, as previously mentioned, but also a distributor; it is provided with a bore 24 through which it can be connected to a source of fluid under pressure (FIGS. 6, 7 and 8), and also provided with a bore 25 which forms a distribution chamber for this fluid under pressure and in which a distribution slide 26 is mounted for movement for this purpose (FIGS. 2 and 7).

As can be seen more clearly in FIGS. 7 and 8 the distribution slide 26 is movable between two positions, namely a first position in which it brings the pressure chamber 13 into communication with the bore 24, and therefore with a source of fluid under pressure (FIG. 7), and a second position in which it brings this pressure chamber 13 into communication with a discharge (FIG. 8).

In either of the positions in question the distribution slide 26 also effects the lubrication of the whole arrangement, particularly of the frictional contact between the sleeve 20 of the driven part 10 and the flange 23 of the fixed support 22.

When the pressure chamber 13 is in communication with the bore 24 of the support 22, and therefore with a source of fluid under pressure (FIGS. 1 to 7), the piston element 12 axially grips the inserted discs 16 and the friction discs 18 against the plate 14 closing the associated cylinder element 11, and through friction the driven part 10 is therefore axially fastened to the driving part 17.

The clutch is therefore in the position of engagement.

When the pressure chamber 13 is connected to the discharge (FIG 8.) the clutch is in the position of disengagement.

Elastic means are in fact interposed between the elements 11 and 12 of which the driven part 10 is composed, in order to urge these elements permanently in the direction of this position of disengagement, in which the friction discs 18 of the driving part 17 are released.

In the example of embodiment illustrated these elastic means comprise a spring 27 interposed between the piston element 12 of the driven part 10 and a retaining bush 28 axially fastened on the sleeve 20 of the cylinder element 11 of this driven part 10.

As mentioned above, these arrangements are well known per se.

It is also known to associate with the rotating member constituted by the cylinder element 11 of the driven part 10 a brake 31 which is adapted to lock the said element 11 in respect of rotation when the clutch is in the position of disengagement, the element 11 being provided externally with a cylindrical bearing surface 30 for this purpose.

According to the invention the brake 31 thus associated with the cylinder element 11 of the driven part 10 is a band brake, this brake 31 comprising a brake band 32 wrapped in a loop around the cylindrical bearing surface 30 of this driven part and carrying in contact with the latter, over part of its periphery, a friction lining 33.

The operating member 35 provided in the brake 31 for applying the brake band 32 against the cylindrical bearing surface 30 is of the hydraulic type and comprises two pistons 36A and 36B which are movable in opposite directions in the same cylinder 37 and are disposed between the said brake band 32 and the said cylindrical bearing surface 30, roughly radially in relation to the latter and in alignment with one another, the first of them serving to act on the said brake band and thus to apply the latter against a first part of the said cylindrical bearing surface 30, and the second serving to apply a brake shoe 40 against a second part of the said cylindrical bearing surface, the second part being diametrically opposite the first.

In practice, in the example illustrated, an adaptation wedge 38 is interposed between the brake band 32 and the piston 36A intended to act on the latter, this wedge and the brake band 32 being simultaneously fastened by screws 39 to the said piston.

The cylinder 37 common to the two pistons 36A, 36B is fastened to the support 22 and is carried laterally by that part of the latter in which the previously described bores 24 and 25 are formed (FIGS. 5 and 6).

By way of a bore 42, which at its free end is closed by a ball 43 (FIG. 4) the internal space of the cylinder 37 between the pistons 36A, 36B is in communication with the bore 25 of the support 22 forming a distribution chamber, the said bore 42 being intersected by a bore 44 which leads into the said internal space and which at its opposite end is closed by a ball 45.

In the position of clutch engagement shown in FIG. 7 the distribution slide 26 brings the internal space of the cylinder 37 into communication with the discharge, so that the brake 31 is then inoperative.

On the other hand, in the position of disengagement illustrated in FIG. 8 the distribution slide 26 brings the internal space of the cylinder 37 into communication with the bore 24 in the fixed support 22 and therefore with the associated source of fluid under pressure.

This has the consequence that simultaneously, the piston 36A applies the brake band 32—or more precisely the friction lining 33 carried by the latter—against the cylindrical bearing surface 30 of the driven part 10, and the piston 36B applies the brake shoe 40 against the said cylindrical bearing surface 30.

As a result of this arrangement, and particularly of the friction surfaces involved, the forces due to the pistons 36A, 36B are statically balanced.

Apart from any rotation, there is consequently no radial resultant acting on the driven part 10 due to the braking forces applied to it.

Consequently, these braking forces do not in practice give rise to any tipping moment on the driven part 10, and the wear on the flange forming the bearing 23 of the support 22 is advantageously reduced.

If desired, the inside bore of this flange 23 may however be treated, for example with molybdenum.

In an alternative embodiment (FIG. 9), bearings 50, for example ball or needle bearings, may be interposed between the sleeve 20 and the flange 23 forming the bearing for the axial sleeve 20 of the driven part 10.

In either embodiment, the brake band 32 may be composed of a simple strip, for example of metal, of which the end portions are superimposed in a region again the positions of the screws 39 effecting the fastening of this brake band to the piston 36A associated with it.

The present invention is obviously not limited to the embodiments described and illustrated, but includes any modified embodiment and/or combination of their various elements.

In particular, the two movable elements comprising the member operating the band brake according to the invention, instead of being two pistons mounted for sliding in a common cylinder, could be a blind cylinder in the one case and a piston mounted for sliding in the said cylinder in the other case; in this arrangement the blind cylinder is preferably suitably guided radially in relation to the bearing surface 30.

Furthermore, when two pistons are used, these pistons are not necessarily mounted for sliding in a common cylinder.

In addition, it is obvious that the respective roles of the driving part and driven part may be transposed, the terms "driving" and "driven" having been selected here only for convenience of explanation.

In all cases it will be observed that according to the invention the piston type operating member acting on the brake band intervenes without the aid of any lever or other transmission or gearing element, which is particularly favourable to the effectiveness and efficiency of the brake concerned.

Finally, the field of application of the invention is not limited to that of clutches, but extends to all mechanisms containing a member which has to be braked.

I claim:

1. A band brake for a rotatable member having a cylindrical bearing surface, said band brake comprising a brake band extending in a loop around a cylindrical bearing surface of said rotatable member, and a hydraulic operating member adapted to apply said brake band against part of said cylindrical bearing surface, said operating member comprising two elements independently movable in opposite directions and disposed between the brake band and the cylindrical bearing surface, said elements being disposed substantially radially in relation to said cylindrical bearing surface and in axial alignment with each other radially of said cylindrical bearing surface, one of said elements being cooperable with said brake band to apply said brake band against said part of said cylindrical bearing surface and the other of said elements being associated with a brake shoe to apply said brake shoe against another part of said cylindrical bearing surface diametrically opposite the first mentioned part thereof.

2. A brake according to claim 1, in which an adaptation wedge is interposed between said brake band and said other element associated therewith.

3. A hydraulically operated clutch comprising two coaxial rotatable parts, said two parts including a driven part having two component elements which are in a cylinder-piston relationship and define a pressure chamber of variable volume between each other, and a driving part comprising at least one friction disc which is adapted to be gripped axially between said component elements of said driven part for the purpose of fastening them for rotation together when fluid under pressure is delivered into the pressure chamber, elastic means interposed between said component elements of said driven part and urging the latter into a disengaged position to release said friction disc, and in combination with said band brake as claimed in claim 1 associated with said driven part with said driven part being said rotatable member, and said hydraulic operating member being adapted to apply said brake band against said first-mentioned part of said cylindrical bearing surface when said friction disc is released.

4. A clutch according to claim 3, in which the operating member of said band brake comprises two hydraulically operated pistons forming said one element and said other element.

5. A clutch according to claim 4, in which a support forming a bearing for said driven part is provided, and said pistons of said operating member of said band brake are mounted for movement in a common cylinder fastened to said support.

6. A clutch according to claim 5, in which said support forms a distributor valve and a distributor valve member is mounted for movement in a distribution chamber provided in said distributor valve, and an internal space of said common cylinder is in communication with said distribution chamber.

7. A brake according to claim 1, in which said elements are hydraulically operable pistons.

8. A brake according to claim 1, in which there is a support forming a bearing for said rotatable member, and a common cylinder for said two pistons fixedly carried by said support.

* * * * *

UNITED STATES PATENT AND TRADEMARK OFFICE
CERTIFICATE OF CORRECTION

PATENT NO. : 4,222,470

DATED : September 16, 1980

INVENTOR(S) : CARLO BECCARIS

It is certified that error appears in the above—identified patent and that said Letters Patent is hereby corrected as shown below:

Claim 8, line 1, claim "1" should read claim -- 7 --.

Signed and Sealed this

Ninth Day of December 1980

[SEAL]

Attest:

SIDNEY A. DIAMOND

Attesting Officer

Commissioner of Patents and Trademarks